United States Patent
Bunker

[11] Patent Number: 6,099,245
[45] Date of Patent: Aug. 8, 2000

[54] TANDEM AIRFOILS

[75] Inventor: Ronald Scott Bunker, Niskayuna, N.Y.

[73] Assignee: General Electric Company, Schenectady, N.Y.

[21] Appl. No.: 09/182,779

[22] Filed: Oct. 30, 1998

[51] Int. Cl.[7] .................................................. F01D 5/14
[52] U.S. Cl. ........................................ 415/115; 415/209.4
[58] Field of Search ............................. 415/115, 208.1, 415/208.2, 209.1, 209.3, 209.4, 210.1; 416/223 R, 97 R

[56] References Cited

U.S. PATENT DOCUMENTS

| | | | |
|---|---|---|---|
| 2,029,813 | 2/1936 | De Mey | 415/208.2 |
| 2,649,278 | 8/1953 | Stalker | 415/115 |
| 2,701,120 | 2/1955 | Stalker | 416/90 R |
| 4,314,442 | 2/1982 | Rice | 415/115 X |
| 4,749,333 | 6/1988 | Bonner et al. | 415/209.4 X |
| 4,897,020 | 1/1990 | Tonks | 415/115 |
| 5,797,725 | 8/1998 | Rhodes | 415/209.2 |

OTHER PUBLICATIONS

Joseph L. Mallardi, "From Teeth to Jet Engines," Howmet Corp., Greenwich, CT. 1992.

*Primary Examiner*—John E. Ryznic
*Attorney, Agent, or Firm*—Patrick K. Patnode; Marvin Synder

[57] ABSTRACT

A machine vane unit includes a first airfoil and a second airfoil located between and connected to a first flange and a second flange. The second airfoil includes a second leading portion located rearward of a first leading portion of the first airfoil relative to a direction of intended flow. The first flange and the second flange are configured to be connected to casing for a machine portion. The first airfoil and/or the second airfoil may include and/or have cast therein a hollow. The first airfoil and the second airfoil may be formed integrally.

14 Claims, 5 Drawing Sheets

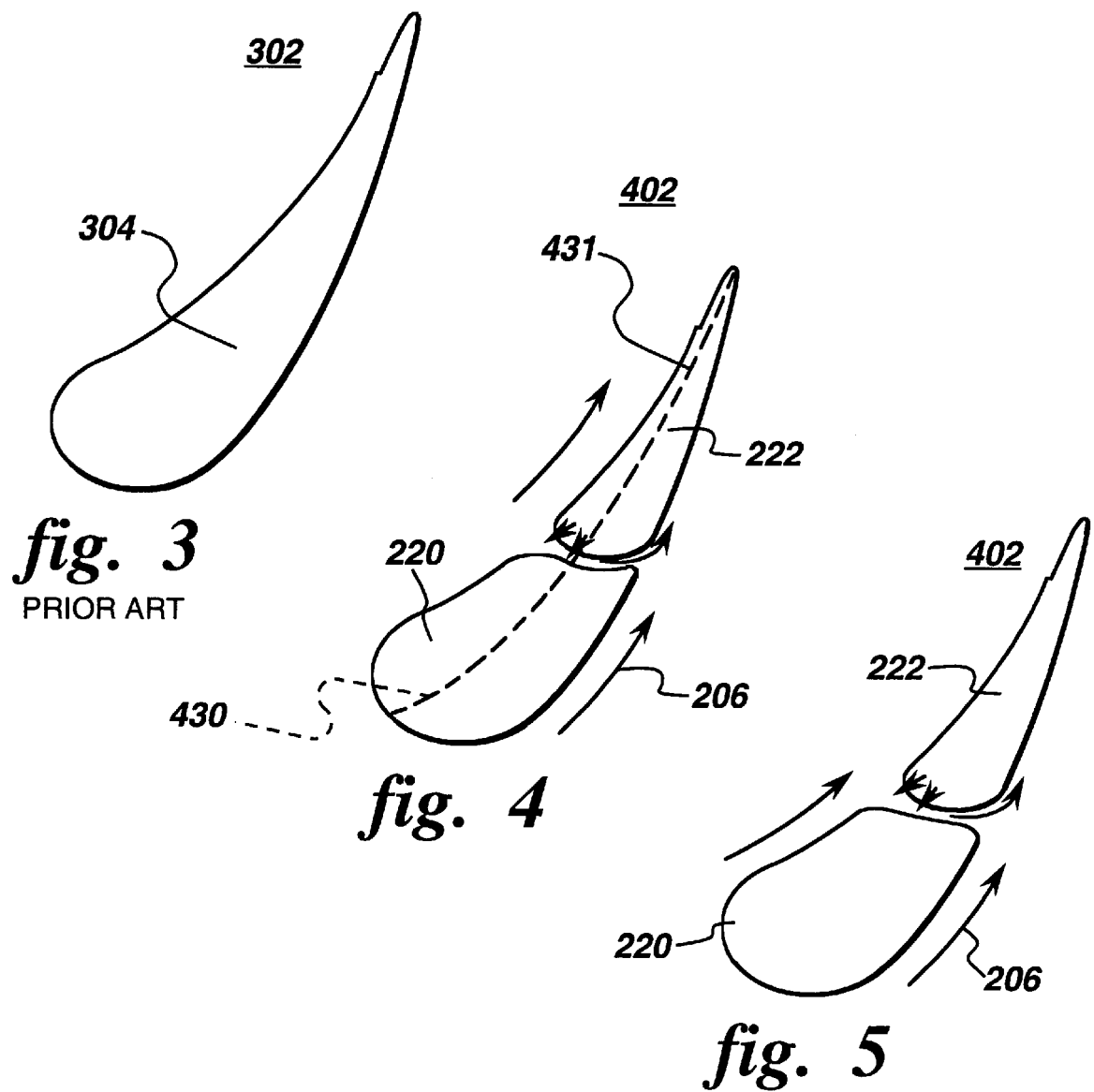

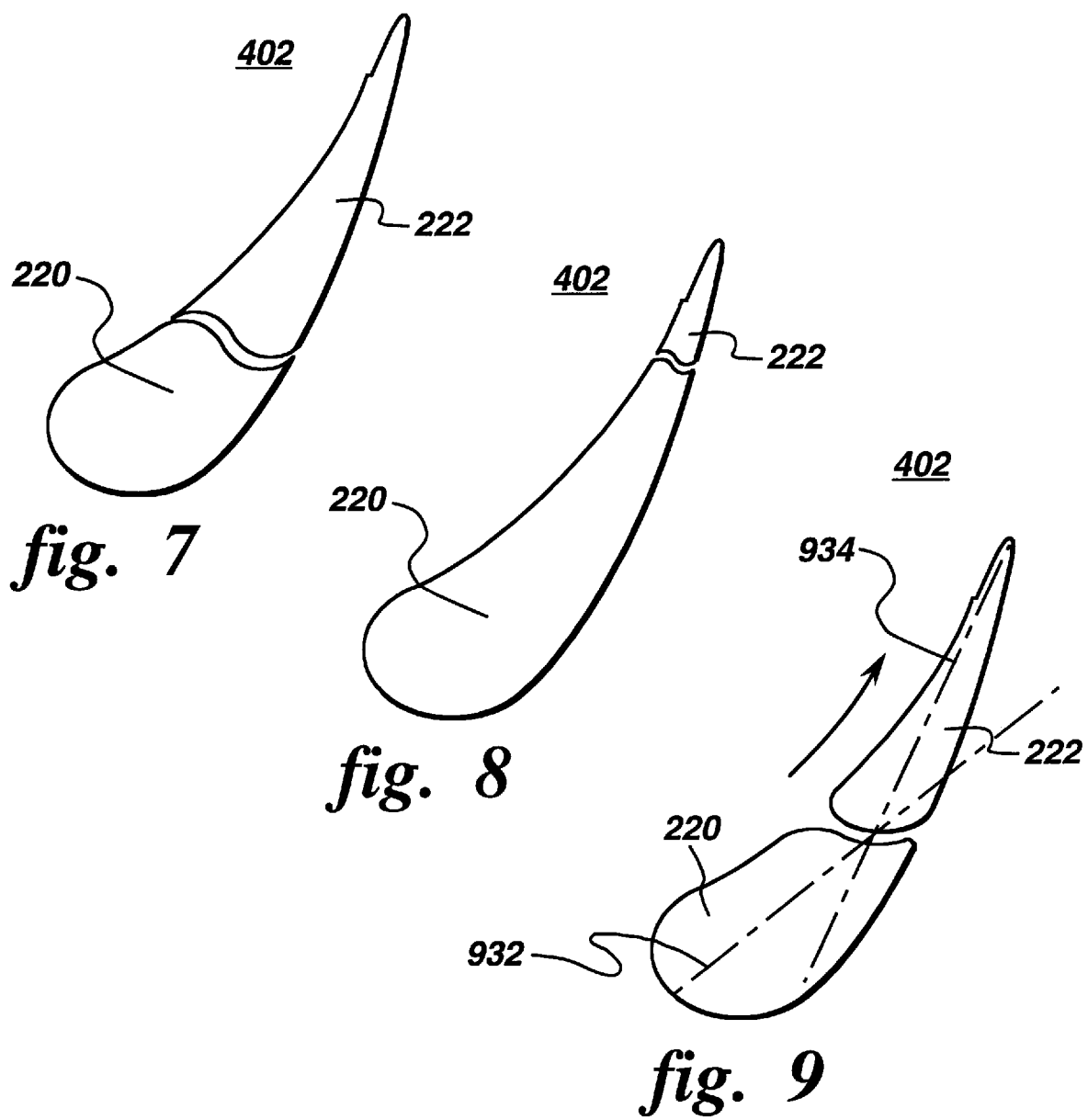

TANDEM AIRFOILS

BACKGROUND OF THE INVENTION

This invention relates, generally, to airfoils and, more particularly, to tandem airfoils.

Airfoils may be employed in, for example, power turbines, compressors or aircraft engines. Vanes and blades are examples of airfoils. A blade, which may also be referred to as a "bucket" or "rotor," may comprise an airfoil mounted to a wheel or disk, for rotation about a shaft. In addition, a vane, which may be referred to as a "nozzle" or "stator," may comprise an airfoil mounted in a casing surrounding or covering the shaft about which the blade rotates. Typically, a series of blades may be mounted about the wheel at a particular location along the shaft. Furthermore, a series of vanes may usually be mounted upstream (e.g., relative to a general flow direction) of the series of blades, such as for maximizing efficiency of fluid (e.g., gas) flow. Such an arrangement of vanes succeeded by blades may be referred to as a "stage."

For example, a number of stages of vanes and blades may be located in a compressor in order to compress gas (e.g., air), to be mixed and ignited with fuel, such as to be delivered to an inlet of a turbine. The turbine may include a number of stages of vanes and blades in order to extract work from the ignited gas and fuel. The fuel may comprise, for example, natural gas or oil. Further, the addition of the fuel to the compressed gas may comprise a contribution of energy to the combustive reaction, that may raise the temperature of the gas to, for example, 3000 to 3500 degrees Fahrenheit, the product of this combustive reaction then flows through the turbine.

In order to withstand high temperatures, produced by combustion an airfoil in the turbine may include a hollow therein or passage therethrough for receiving coolant. Exemplary cooling designs include air-cooling, steam-cooling, open-circuit cooling, closed-cooling or film-cooling configurations.

Previous manufacturing techniques for relatively large vanes often have difficulties in achieving uniform wall thickness. Non-uniform wall thickness often creates inefficiencies in gas compression and a corresponding loss of extracted work.

Accordingly, a need in the art exists for airfoils allowing formation over a large range of sizes. A further need exists for such vanes whose formation provides cooling and uniform wall thickness, or better controlled wall thickness.

SUMMARY OF THE INVENTION

A machine vane unit includes a first airfoil and a second airfoil located between and connected to a first flange and a second flange. The second airfoil includes a second leading portion located rearward of a first leading portion of the first airfoil relative to a direction of intended flow. The first flange and the second flange are configured to be connected to casing for a machine portion. The first airfoil or the second airfoil may include or have cast therein a hollow. The first airfoil and the second airfoil may be formed integrally.

BRIEF DESCRIPTION OF THE DRAWINGS

FIG. 3 is a cutaway, sectional, top representation of one example of a prior art singlet vane;

FIG. 4 is a cutaway, sectional, top representation of one example of a singlet tandem vane, illustrating a mean camber line and an exemplary spacing among and sizing of airfoils;

FIG. 5 is a cutaway, sectional, top representation of the singlet tandem vane of FIG. 4, illustrating another exemplary spacing among the airfoils;

FIG. 7 is a cutaway, sectional, top representation of the singlet tandem vane of FIG. 4, illustrating another exemplary sizing of the airfoils;

FIG. 8 is a cutaway, sectional, top representation of the singlet tandem vane of FIG. 4, illustrating yet another exemplary sizing of the airfoils; and FIG. 9 is a cutaway, sectional, top representation of the singlet tandem vane of FIG. 4, illustrating multiple mean camber lines.

DETAILED DESCRIPTION

Figure 1:
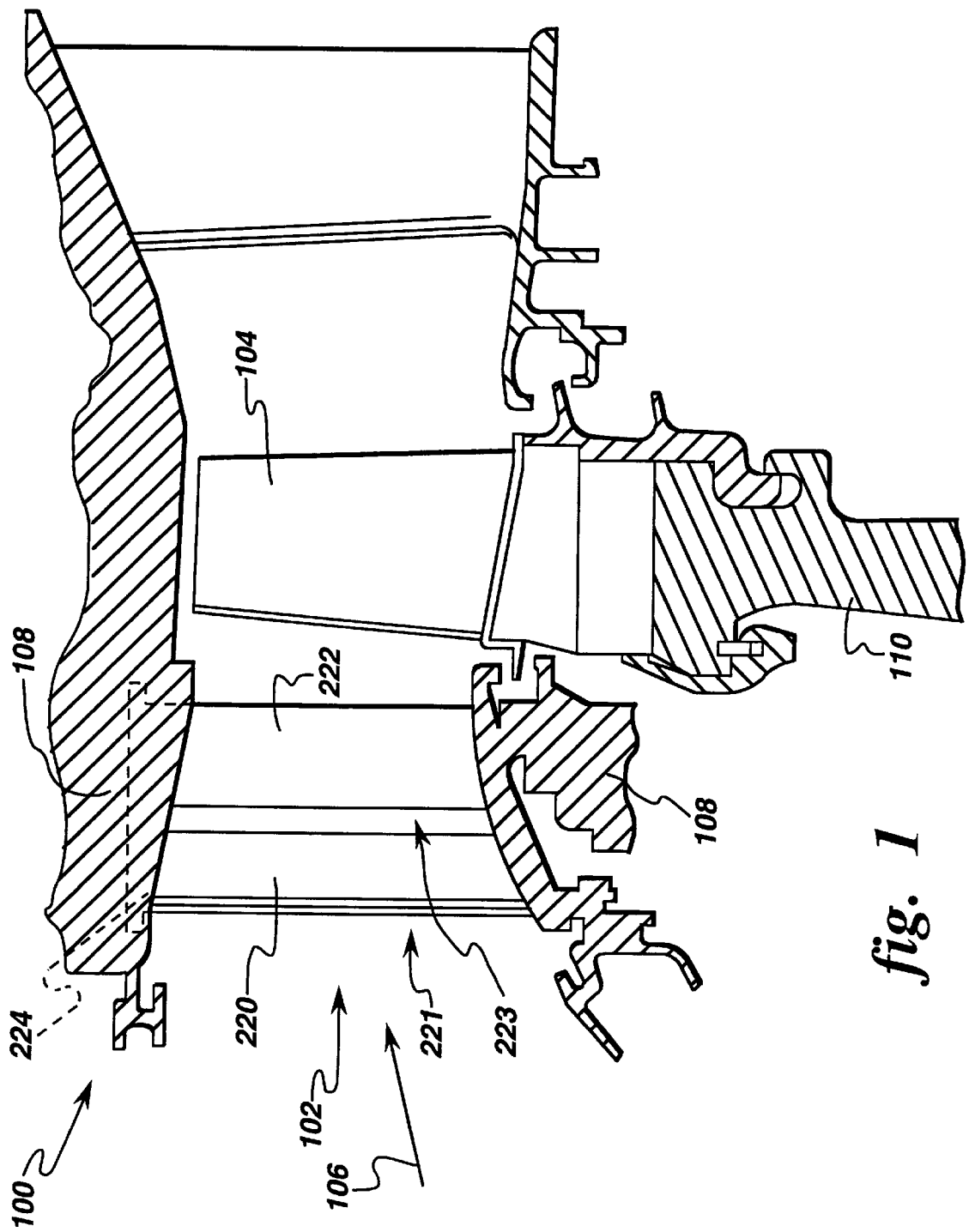
FIG. 1 is a cutaway, sectional, partial, side view of one example of exemplary formation and positioning of a tandem vane mounted to casing and located before, relative to an exemplary direction of intended flow, a blade mounted to a wheel, such as in a stage.

Referring to FIG. 1, stage 100 may comprise a plurality, for example, forty-eight, of tandem vanes (or "tandem nozzles" or "tandem stators") 102 located upstream of a plurality of, for example, sixty, blades (or "buckets" or "rotors") 104, relative to exemplary, representative, intended flow direction 106. Tandem vanes 102 may be mounted to a casing 108 of, for example, a portion of a machine such as a turbine, a compressor, or an engine. Blades 104 may be mounted to a wheel 110. In one aspect, tandem vane 102 may be considered to be a relatively stationary component, and blade 104 may be considered to be a relatively rotatable component. As will be discussed further below, it may be desirable to maximize a manufacturing production yield (e.g., the percentage of completed parts passing a certain quality inspection) for a component such as the tandem vane, for various dimensions or configurations thereof.

Still referring to FIG. 1, in one example, wheel 110 may be connected to a rotatable shaft (not shown). Also, casing 108 may be rotatably isolated from the shaft by a bearing (not shown), as will be understood by those skilled in the art. In one aspect, stage 100 may comprise a turbine first stage receiving a high temperature, high pressure (e.g., gas) mixture from a combustor (not shown). As will be further understood by those skilled in the art, the shaft may be connected with an electrical generator set (e.g., a rotor/stator system) to generate electricity.

In another aspect, referring to FIG. 1, stage 100 may be followed by additional (e.g., second, third, or fourth) stages (not shown). In a further example, tandem vane 102 and blade 104 may comprise such an additional stage or may be located in a compressor or an engine.

Although different stages may perform comparable functions, individual components within one stage may have different designs (e.g., different sizes, materials, and/or complexities of manufacturing procedures) from those of another stage. For example, in a turbine, each stage may progressively become larger in size to accommodate expansion of gases with pressure drop or work extraction. In another example, sizes may progressively decrease in a compressor to cause an increased pressure or temperature of the gas.

Again referring to FIG. 1, a number of instances of tandem vane 102 may serve to direct flow of fluid, for instance, gas (e.g., air), received generally along flow direction 106, to a number of instances of blade 104. In particular, tandem vane 102 may be configured to optimize, promote or enhance an aerodynamic efficiency in extraction of work (e.g., shaft power) from the gas by blade 104.

Referring further to FIG. 1, it may be desirable to extract as much work from the gas as may be possible, in view of constraints such as strength of constituent material or ability to design an aerodynamically-efficient part, for example, to avoid flow separation or other gross losses. For instance, when gas exits the combustor (not shown) and enters the turbine first stage, the gas may be flowing generally axially. In one example, one may enhance the aerodynamic power provided to the instances of blade 104 by employing the instances of tandem vane 102 in order to turn, channel, or guide the flow. In particular, the instances of tandem vane 102 may be employed to turn the flow to approach the instances of blades 104 at an aerodynamically-efficient angle, as will be appreciated by those skilled in the art.

Figure 2:
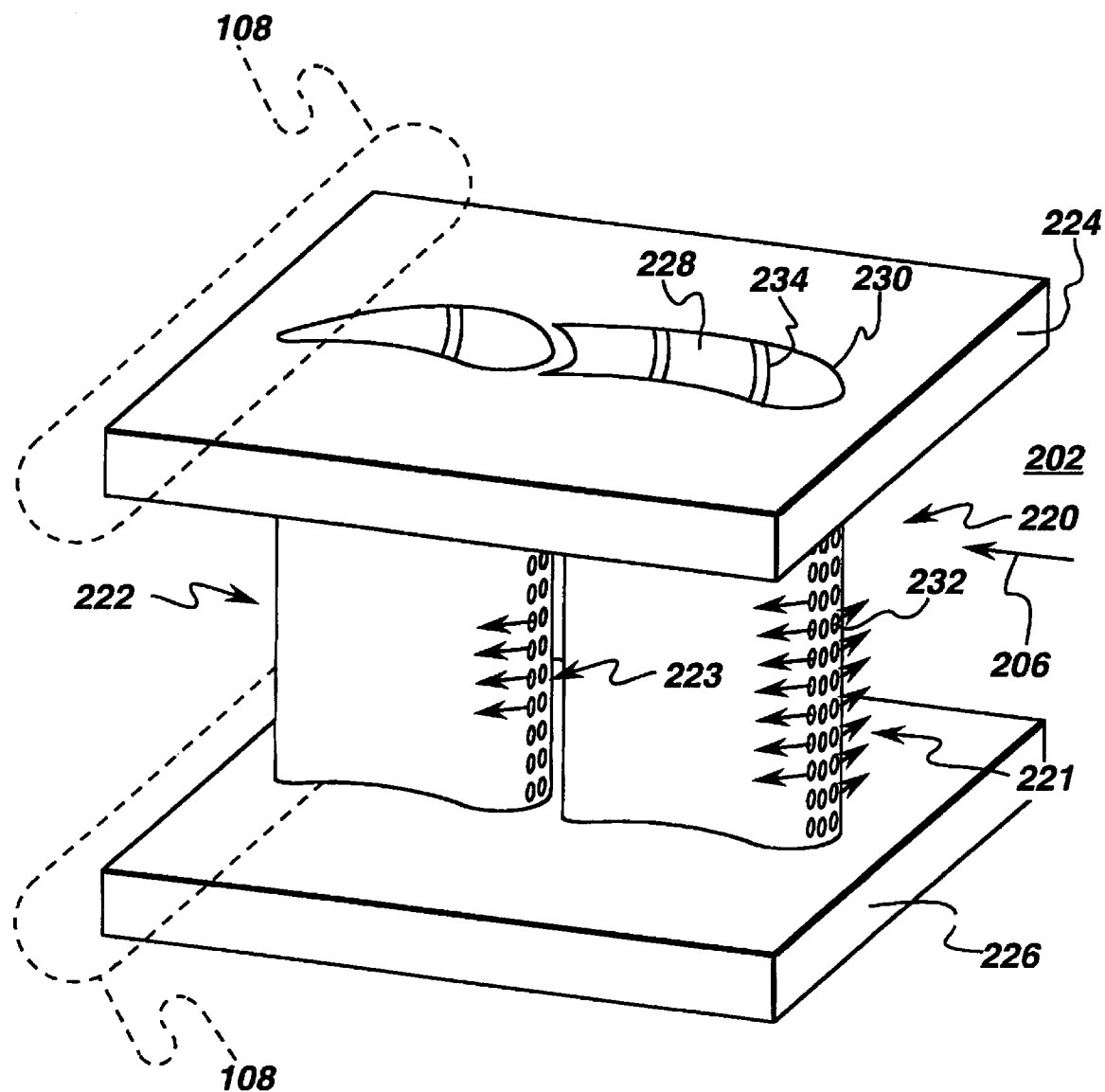
FIG. 2 is a perspective view of one example of a singlet tandem vane, illustrating an exemplary cooling configuration.

Turning to FIG. 2, a singlet tandem vane 202 may comprise a first airfoil 220 located ahead of a second airfoil 222, relative to an exemplary flow direction 206. First airfoil 220 and second airfoil 222 are typically disposed between and connected to a first flange 224 and a second flange 226. First flange 224 may be referred to as a "first end wall," and second flange 226 may be referred to as a "second end wall." In one aspect, first airfoil 220 may be considered to comprise a leading airfoil, and second airfoil 222 may be considered to comprise a trailing airfoil. First airfoil 220 includes a first leading portion 221, and second airfoil 222 includes a second leading portion 223, as described herein. As further described herein with reference to FIG. 6, a third airfoil 1220 includes a third leading portion 1221, and a fourth airfoil 1222 includes a fourth leading portion 1223. Again referring to FIG. 2, in one example, first flange 224 and second flange 226 are configured for receipt by or attachment to casing 108 (FIG. 1), with structural interconnection (e.g., by struts), as will be understood by those skilled in the art.

With reference to singlet tandem vane 202 (FIG. 2), the term "singlet" may be considered to indicate that a single vane unit is located between and connected to the same flanges. In addition, the vane unit may be considered to represent a functional or structural unit, for instance, of a vane component of a stage. Moreover, with reference to doublet tandem vane 602, as will be described further below with reference to FIG. 6, the term "doublet" may be considered to indicate that a pair of vane units are located between and connected to the same flanges. Furthermore, vane units may comprise other numbers or types of airfoils, or may have airfoils disposed therein in other (e.g., staggered or offset) arrangements, as will be appreciated by those skilled in the art.

Referring again to FIG. 2, in one example, first airfoil 220 may comprise a solid airfoil, or second airfoil 222 may comprise a solid airfoil. A solid airfoil may be referred to as "uncooled." In another example, tandem vane 202 may comprise a cooled component. For instance, singlet tandem vane 202 may be configured for any cooling design, such as air-cooling, steam-cooling, open-circuit cooling, closed-cooling or film-cooling configurations, as will be understood by those skilled in the art. In particular, first airfoil 220 may include a hollow 228 therein. For instance, first airfoil 220 may include ribs 234, to provide structural support for hollow 228 within first airfoil 220. In one example, first flange 224 may include an opening 230 providing fluid communication with hollow 228. Further, an exterior surface 255 of first airfoil 220 typically includes a plurality of holes 232 therethrough to provide fluid communication with hollow 228, such as in a film-cooling configuration.

Referring to FIGS. 1–2, coolant may be supplied through a conduit (not shown) in casing 108 for flowing though opening 230, into hollow 228, and out from holes 232. Such cooling may serve to keep the temperature of constituent material for singlet tandem vane 202 within certain acceptable limits, in view of the hot gas ducted by singlet tandem vane 202 to one or more instances of blade 104.

Any number of comparable features described herein for first airfoil 220 may or may not be implemented for second airfoil 222. Further, any number of features described herein for first flange 224 may be instead or additionally implemented for second flange 226.

Now referring to FIG. 3, a prior art vane 302 may comprise single airfoil 304. The prior art vane is illustrated with a typical configuration for purposes of comparison with the present invention, as presented herein.

Referring to FIGS. 3–4, tandem vane 402 differs from prior art vane 302, in a first aspect, by comprising first airfoil 220 and second airfoil 222 instead of single airfoil 304. In a further aspect, where overall dimensions for the prior art vane 302 and tandem vane 402 are comparable, first airfoil 220 and second airfoil 222 may resemble a division, such as "a splitting in two," of airfoil 304. Such division or multiplication, in one aspect, may provide an advantage in, for example, casting of relatively large vanes, as described herein.

Referring still to FIGS. 3–4, with respect to tandem vane 402, first airfoil 220 and second airfoil 222 individually may experience desirably less stress than the stress experienced by single airfoil 304 of prior art vane 302, under comparable gas flows for tandem vane 402 and prior art vane 302. Further, first airfoil 220 and second airfoil 222 as a unit may advantageously perform comparable aerodynamic turning to that performed by airfoil 304 under a certain gas flow condition applied to tandem vane 402 and prior art vane 302. Moreover, where it may be desirable that a vane have relatively large dimension and perform under high temperature, tandem vane 402 presents a configuration for casting that addresses shortcomings of prior art vane 302. For example, previous approaches have failed to allow casting of relatively large vanes configured for cooling with relatively thin walls of substantially uniform thickness, as further discussed herein.

Now referring to FIGS. 2–4, where it may be desirable to cast a cooled vane having an overall length in the range between about 30 cm to about 50 cm (e.g., 45 cm) and an overall height in the range between about 15 cm to about 25 cm (e.g., 20 cm) with a wall thickness between about 1.5 mm to about 2.0 mm, the configurations of tandem vanes 102, 202, 402 advantageously allow casting thereof to meet such desired parameters, whereas previous approaches to cast prior art vane 302 have failed to satisfy the exemplary requirements. For example, casting of prior art vane 302 with the desired relatively large overall length and height may provide a wall thickness which may undesirably vary between about 1.0 mm to 3.0 mm, which may be unacceptable (e.g., thermally or mechanically). In one aspect, such relatively wide variation in wall thickness of the prior art vane may reduce the life of the part. So, previous vanes of relatively large size typically have had a wall thickness of about 2.5 mm or more, which thickness allows acceptable uniformity in wall thickness at a size that undesirably limits or reduces cooling effectiveness.

For instance, the present invention may advantageously enhance performance of machines such as turbines, compressors or engines, by enabling casting of tandem vanes 102, 202, 402 to meet requirements such as these outlined above. In one aspect, the individually smaller sizes of first airfoil 220 and second airfoil 222 relative to airfoil 304 of prior art vane 302, may allow the configurations for tandem vanes 102, 202, 402 to satisfy desired parameters such as thin walls for a cooled vane having substantially uniform thickness. In one example, a tandem vane of the present invention, such as tandem vane 102 (FIG. 1), may be formed by employing a technique such as investment casting. An exemplary investment casting process is disclosed in a document entitled "From Teeth to Jet Engines" (authored by Joseph L. Mallardi, copyrighted 1992, and available from Howmet Corporation, Corporate Relations Department, P.O. Box 1960, 475 Steamboat Road, Greenwich, Conn. 06836-1960, U.S.A.).

Furthermore, a tandem vane of the present invention may be formed with a material such as, for example, steel for relatively low-temperature based applications, or a (e.g., nickel-based or cobalt-based) superalloy for relatively high-temperature based applications. In a further aspect, such a material may be formed as a single-crystal ("SC") directionally-solidified ("DS"), or equi-axed ("EA") material.

In one aspect of the present invention, it may be desirable to implement the tandem vane as a cooled tandem vane, such as singlet tandem vane 202 (FIG. 2). In particular, a temperature of gas flow on an exterior of singlet tandem vane 202 may be on the order of 3000 degrees Fahrenheit or more. In one example, a certain constituent metal for a tandem vane may melt several hundred degrees Fahrenheit below the 3000 degrees Fahrenheit temperature were it not for coolant flowing therein or therethrough. Were the tandem vane not cooled, then the gas flow temperature applied thereto may need to be limited to a much lower temperature, fuel supplied for the combustive reaction may need to be limited, which limitations may undesirably be incorporated into a design process such as by reducing stages for a compressor so a gas would not achieve as high a temperature or pressure. It may be desirable, however, to supply higher gas temperatures to, for instance, a turbine through higher combustor exit temperatures for the gas flow, to increase efficiency of the turbine.

In a still further aspect, it may be advantageous to maintain a relatively consistent or uniform wall thickness over the tandem vane, at a relatively thin dimension. Such uniformity may be desirable for material strength, to avoid development of excess (e.g., thermal, mechanical) stresses in the tandem vane. In another aspect, casting of a part having more-uniform wall thickness may be easier than casting a part having non-uniform wall thickness. In yet another aspect, relative thinness of the wall for the tandem vane may promote cooling for increased efficiency or capability, as will be appreciated by those skilled in the art.

Returning to FIG. 2, in one example, first airfoil 220, second airfoil 222, first flange 224, and second flange 226 may be formed (e.g., cast integrally). In another example any number of such parts may be formed integrally or separately, or with any desired features or configurations. For instance, first airfoil 220, second airfoil 222, first flange 224, and second flange 226, may be formed separately, and then connected together such as by welding or brazing. Additionally, different parts of tandem vane 202 may be formed with different (e.g., compatible) materials.

Referring to FIGS. 4–5, opposing faces of first airfoil 220 and second airfoil 222 may have various configurations, such as for promoting various flow patterns or aerodynamic efficiencies (e.g., avoidance of flow separation or drag).

Moreover, referring to FIGS. 7–8, first and second airfoils (220,222) may have relatively different sizes, such as where their axial lengths differ.

In a still further aspect, referring to FIGS. 4 and 9, particular sections of first and second airfoils (220, 222) may be aligned along a same mean camber line (or "mean chord line") 430, 431, or be offset with distinct mean camber lines such as a first mean camber line 932 and a second mean camber 934. Generally, an airfoil may be considered to comprise a pressure side (e.g., a concave side) and a suction side (e.g., a convex side). A mean camber line may be located midway between the pressure side and the suction side of an airfoil. Such a mean camber line may be considered to run down a middle of an airfoil shape in an in-line design, where airfoil 220 and second airfoil 222 may share a mean camber line. In particular, first airfoil 220 and second airfoil 222 may be in-line or offset with respect to a mean camber line. Further, in an offset arrangement, first airfoil 220 and second airfoil 222 may have different mean camber lines. Moreover, three-dimensional aspects of first airfoil 220 and second airfoil 222 of the tandem vane may be considered. For instance, a shape of the mean camber line may change at some or all cross-sections. That is, configuration of the tandem vane may consider a locus of individual mean camber lines at multiple cross-sections of first airfoil 220 or second airfoil 222.

Figure 6:
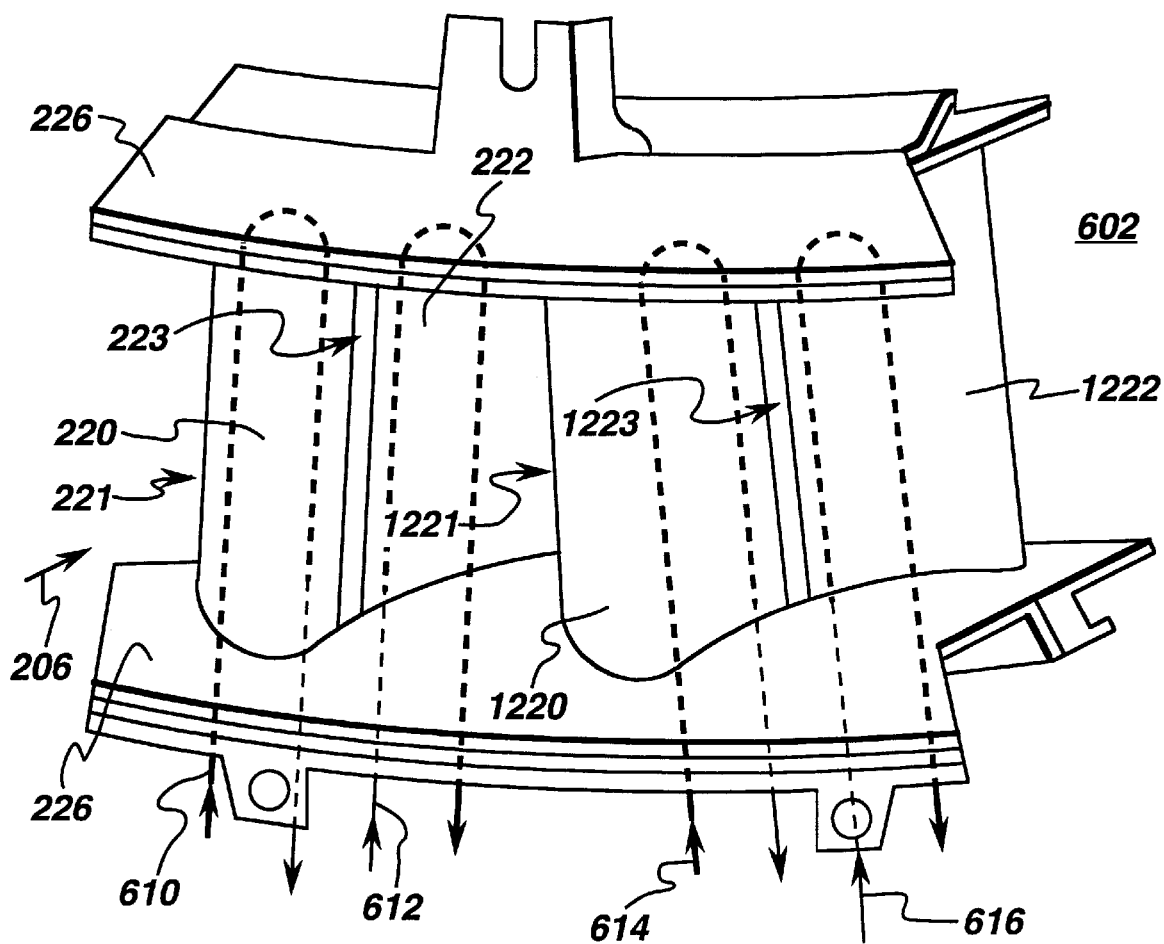
FIG. 6 is a perspective view of one example of a doublet tandem vane, illustrating an exemplary cooling configuration.

Turning to FIG. 6, doublet tandem vane 602 may comprise first airfoil 220 located upstream of second airfoil 222 relative to exemplary flow direction 206, and a third airfoil 1220 located upstream of fourth airfoil 1222 relative to the flow direction 206. Furthermore, first airfoil 220, second airfoil 222, third airfoil 1220 and fourth airfoil 1222 may be located between and connected to first flange 224 and second flange 226. For purposes of illustration, coolant flow paths 610, 612, 614, and 616 depict exemplary closed-circuit cooling for coolant flow within corresponding hollows 228 (FIG. 2) of, respectively, first airfoil 220, second airfoil 222, third airfoil 1220, and fourth airfoil 1222. A tandem vane of the present invention may include any plural number of vane airfoils.

As will be understood by those skilled in the art, as a working fluid (e.g., air) flows over a surface of an airfoil, a boundary layer may be built up. Further, as the working fluid flows against a longer surface, a boundary layer grows in thickness. Aerodynamically, it may be desirable that a trailing edge of an airfoil be as thin as possible, since an exterior width of the airfoil plus the thickness of the working fluid boundary layer about the airfoil, sum to an effective thickness of the wake of the airfoil. In particular, the effective thickness of the wake of the airfoil may be inversely proportional to the aerodynamic efficiency of the airfoil. So, it may be desirable to minimize the wake in order to maximize aerodynamic efficiency.

In one aspect of the invention, returning to FIGS. 3–4, by dividing single airfoil 304 of prior art vane 302 into first airfoil 220 and second airfoil 222 of tandem vane 402, the growth of the boundary layer for the tandem vane may be restarted at the gap between first airfoil 220 and second airfoil 222, so the boundary layer advantageously may not grow to the thickness of the previous single vane design. That is, a breaking point between first airfoil 220 and second airfoil 222 of the tandem vane of the present invention, may serve to restart the boundary layer from zero thickness. So, by the time a trailing edge of the tandem vane may be reached, the effective thickness of the boundary layer advantageously may be less than it would be for the single airfoil of the prior art vane. In a still further aspect, such benefits of the tandem vane of the present invention may also serve to reduce or eliminate deleterious effects upon succeeding airfoils, such as instances of blade 104 (FIG. 1). Namely, the tandem vane may decrease aerodynamic or thermodynamic losses which may result from the mixing in a wake region, as will be appreciated by those skilled in the art.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A machine vane unit, comprising:
   a first flange configured to be connected with a casing for a machine portion;
   a second flange configured to be connected with said casing;
   a first airfoil connected with said first flange and said second flange, said first airfoil located between said first flange and said second flange, said first airfoil including a first leading portion; and
   a second airfoil connected with said first flange and said second flange, said second airfoil located between said first flange and said second flange, said second airfoil including a second leading portion located rearward of said first leading portion relative to a direction of intended flow.

2. The unit of claim 1, wherein at least one of said first airfoil and said second airfoil is formed with a hollow therein.

3. The unit of claim 2, wherein at least one of said first airfoil and said second airfoil is formed with a substantially uniform wall thickness throughout a section generally circumscribing said hollow.

4. The unit of claim 2, wherein said hollow is configured to receive coolant for said machine portion, wherein at least one of said first flange and said second flange is formed with a first opening in fluid communication with said hollow, and wherein at least one of said first airfoil, said second airfoil, said first flange, and said second flange is formed with a second opening in fluid communication with said hollow.

5. The unit of claim 1, wherein said second airfoil is disposed in a tandem relationship with said first airfoil.

6. The unit of claim 1, wherein said first airfoil is formed with a first longitudinal length, wherein said second airfoil is formed with a second longitudinal length, and wherein said first longitudinal length is substantially equal to said second longitudinal length.

7. The unit of claim 1, wherein said first airfoil is formed with a first mean camber line, wherein said second airfoil is formed with a second mean camber line, and wherein said first mean camber line is substantially coaxial with said second mean camber line.

8. The unit of claim 1, further comprising a third airfoil connected with said first flange and said second flange, said third airfoil located between said first flange and said second flange, said third airfoil including a third leading portion located rearward of said first leading portion relative to said direction of intended flow.

9. The unit of claim 1, further comprising a third airfoil connected with said first flange and said second flange, said third airfoil located between said first flange and said second flange, said third airfoil including a third leading portion; and
   a fourth airfoil connected with said first flange and said second flange, said fourth airfoil located between said first flange and said second flange, said fourth airfoil including a fourth leading portion located rearward of said third leading portion relative to said direction of intended flow.

10. The unit of claim 1, wherein a first one of said first flange, said second flange, said first airfoil and said second airfoil is formed with a first constituent material, wherein a second one of said first flange, said second flange, said first airfoil and said second airfoil is formed with a second constituent material, wherein said first one is different from said second one, and wherein said first constituent material is different from said second constituent material.

11. The unit of claim 1, wherein at least one of said first flange and said second flange is connected with said casing, and wherein said machine portion comprises at least one of a turbine portion, an engine portion, and a compressor portion.

12. A machine vane process, comprising:
   connecting a first airfoil with a first flange and a second flange, said first airfoil located between said first flange and said second flange, said first airfoil including a first leading portion, said first flange configured to be connected with casing for a machine portion, said second flange configured to be connected with said casing; and
   locating a second leading portion of a second airfoil rearward of said first leading portion relative to a direction of intended flow, said second airfoil connected with said first flange and said second flange, said second airfoil located between said first flange and said second flange.

13. The process of claim 12, further comprising casting a hollow in at least one of said first airfoil and said second airfoil.

14. The process of claim 12, wherein said connecting of said first airfoil and said locating of said second leading portion comprise forming integrally said first airfoil and said second airfoil.

* * * * *